United States Patent
Wagle et al.

(10) Patent No.: US 12,049,549 B2
(45) Date of Patent: Jul. 30, 2024

(54) FOAMABLE RESIN COMPOSITION FOR CONTROLLING LOSS CIRCULATION

(71) Applicant: Saudi Arabian Oil Company, Dhahran (SA)

(72) Inventors: Vikrant Wagle, Dhahran (SA); Abdullah AlYami, Dhahran (SA); Ali Al-Safran, Dhahran (SA); Mohammad Alharthi, Dammam (SA)

(73) Assignee: Saudi Arabian Oil Company, Dhahran (SA)

( * ) Notice: Subject to any disclaimer, the term of this patent is extended or adjusted under 35 U.S.C. 154(b) by 0 days.

(21) Appl. No.: 18/138,830

(22) Filed: Apr. 25, 2023

(65) Prior Publication Data

US 2023/0257543 A1    Aug. 17, 2023

Related U.S. Application Data

(62) Division of application No. 16/997,589, filed on Aug. 19, 2020, now Pat. No. 11,661,489.

(51) Int. Cl.
| | |
|---|---|
| C04B 26/14 | (2006.01) |
| C08J 9/12 | (2006.01) |
| C08L 63/00 | (2006.01) |
| C09K 8/42 | (2006.01) |
| C09K 8/44 | (2006.01) |

(52) U.S. Cl.
CPC ............... *C08J 9/122* (2013.01); *C04B 26/14* (2013.01); *C08J 2203/04* (2013.01); *C08L 63/00* (2013.01)

(58) Field of Classification Search
None
See application file for complete search history.

(56) References Cited

U.S. PATENT DOCUMENTS

| | | | |
|---|---|---|---|
| 4,072,194 A | 2/1978 | Cole et al. | |
| 4,450,010 A | 5/1984 | Burkhalter et al. | |
| 4,466,833 A | 8/1984 | Spangle | |
| 4,546,118 A | 10/1985 | Simpson | |
| 4,798,848 A | 1/1989 | Dietheln | |
| 5,274,006 A | 12/1993 | Kagoshima | |
| 5,875,845 A | 3/1999 | Chatterji et al. | |
| 5,996,693 A | 12/1999 | Heathman | |
| 6,069,117 A | 5/2000 | Onan et al. | |
| 6,110,982 A | 8/2000 | Russick | |
| 6,213,209 B1 | 4/2001 | Nguyen et al. | |
| 6,715,553 B2 | 4/2004 | Reddy et al. | |
| 6,722,434 B2 | 4/2004 | Reddy et al. | |
| 6,802,375 B2 | 10/2004 | Bosma et al. | |
| 6,858,566 B1 | 2/2005 | Reddy et al. | |
| 6,992,048 B2 | 1/2006 | Reddy et al. | |
| 7,156,175 B2 | 1/2007 | Reddy et al. | |
| 7,288,147 B2 | 10/2007 | Christensen et al. | |
| 7,642,223 B2 | 1/2010 | Santra et al. | |
| 7,922,808 B2 | 4/2011 | Brower et al. | |
| 8,235,116 B1 | 8/2012 | Burts et al. | |
| 8,689,871 B2 | 4/2014 | Khatri et al. | |
| 9,321,956 B2 | 4/2016 | Nguyen et al. | |
| 9,550,933 B2 | 1/2017 | Chatterji et al. | |
| 9,784,079 B2 | 10/2017 | Salla et al. | |
| 10,280,122 B2 | 5/2019 | Salla et al. | |
| 10,287,480 B1 | 5/2019 | Reddy et al. | |
| 10,344,200 B2 | 7/2019 | Salla et al. | |
| 10,450,495 B2 | 10/2019 | Reddy et al. | |
| 10,526,524 B2 | 1/2020 | Reddy et al. | |
| 2004/0152804 A1 | 8/2004 | Inoue | |
| 2007/0173553 A1 | 7/2007 | Taylor, Jr. | |
| 2008/0115692 A1 | 5/2008 | Welton et al. | |
| 2011/0319564 A1 | 12/2011 | Corley | |
| 2014/0131042 A1 | 5/2014 | Nguyen et al. | |
| 2014/0318786 A1 | 10/2014 | Vidma et al. | |
| 2015/0011440 A1 | 1/2015 | Zamora et al. | |
| 2016/0201443 A1 | 7/2016 | Nguyen et al. | |
| 2017/0107420 A1 | 4/2017 | Terrier et al. | |
| 2020/0071598 A1 | 3/2020 | Al-Yami et al. | |

FOREIGN PATENT DOCUMENTS

| | | |
|---|---|---|
| CN | 101319085 | 12/2008 |
| EP | 2167604 | 3/2010 |
| WO | WO2008077499 | 7/2008 |

OTHER PUBLICATIONS

PCT International Search Report and Written Opinion in International Appln. No. PCT/US2021/046640, dated Dec. 10, 2021, 16 pages.

*Primary Examiner* — Melissa A Rioja
(74) *Attorney, Agent, or Firm* — Fish & Richardson P.C.

(57) ABSTRACT

This disclosure relates to a foamable resin composition containing a nitrogen gas-generating compound and methods of using the composition for loss circulation control.

13 Claims, 2 Drawing Sheets

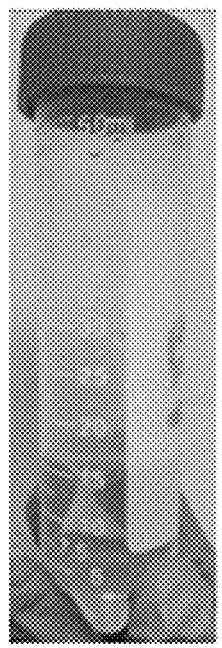
FIG. 1
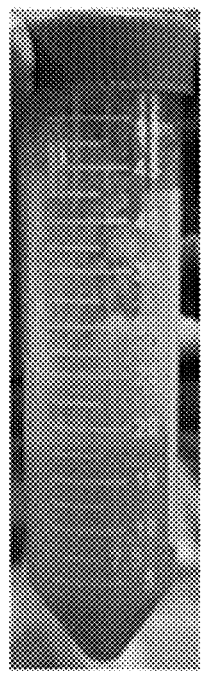 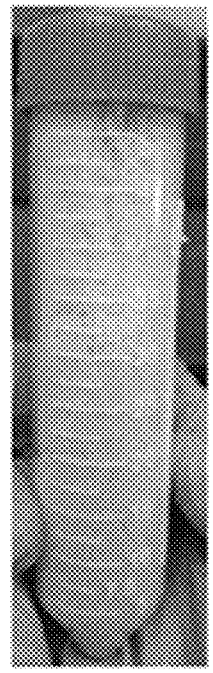
FIG. 2A  FIG. 2B

FOAMABLE RESIN COMPOSITION FOR CONTROLLING LOSS CIRCULATION

CROSS REFERENCE TO RELATED APPLICATION

This application is a divisional of and claims priority to U.S. patent application Ser. No. 16/997,589, filed on Aug. 19, 2020, the entire contents of which is incorporated by reference herein.

TECHNICAL FIELD

This document relates to a foamable resin composition containing a nitrogen gas-generating compound and methods of using the composition for loss circulation control.

BACKGROUND

Natural resources such as gas, oil, and water in a subterranean formation are usually produced by drilling a wellbore down to a subterranean formation while circulating a drilling fluid in the wellbore. Fluids used in drilling, completion, or servicing of a wellbore can be lost to the subterranean formation while circulating the fluids in the wellbore. In particular, the fluids may enter the subterranean formation via depleted zones, zones of relatively low pressure, lost circulation zones having naturally occurring fractures, weak zones having fracture gradients exceeded by the hydrostatic pressure of the drilling fluid, and so forth.

Depending on the extent of fluid volume losses, loss circulation is classified as seepage loss, moderate loss, or severe loss. For oil-based fluids, losses of 10-30 barrels per hour are considered moderate, and losses greater than 30 barrels per hour are considered severe. For water-based fluids, losses between 25 and 100 barrels are considered moderate, and losses greater than 100 barrels are considered severe. For severe losses, the dimensions of the loss circulation zones cannot be estimated which makes it difficult to design loss circulation treatment pills based on the sized particles. The revenue loss due to loss circulation material (LCM) problems extends into tens of millions of dollars.

A reason why loss circulation is difficult to remedy is the lack of knowledge about accurate fracture width and depth encountered while drilling. One of the contributing factors may be lack of precise information on the dimensions of loss circulation areas, which can range from microfractures to vugular zones, thus leading to an improper selection of suitable plugging materials that can adapt, in both volume and shape, to effectively plug a wide range of fractures with unknown dimensions. Traditional loss circulation materials, such as non-reactive particulate or fiber based or settable fluids, when applied in insufficient quantities, cannot effectively seal a high permeability zone. Thus, there is a need for a composition that is adaptable in volume in order to effectively seal a wide range of fractures with unknown dimensions.

SUMMARY

Provided in this disclosure is a foamable resin composition. In some embodiments, the foamable resin composition contains an epoxy resin; a nitrogen gas-generating compound; a surfactant; and a curing agent.

In some embodiments of the composition, the epoxy resin comprises a bisphenol-A-based resin. In some embodiments, the epoxy resin is selected from a bisphenol-A-(epichlorohydrin) epoxy resin with oxirane mono [($C_{12}$-$C_{14}$ alkyloxy)methyl] derivatives and a bisphenol-A-(epichlorohydrin) epoxy resin with 1,6-hexanediol diglycidyl ether. In some embodiments, the epoxy resin is about 75% to about 85% by weight of the composition.

In some embodiments of the composition, the nitrogen gas-generating compound is an azo compound. In some embodiments, the azo compound is azodicarbonamide. In some embodiments, the nitrogen gas-generating compound is about 5% to about 15% by weight of the composition.

In some embodiments of the composition, the surfactant is a hydroxysultaine. In some embodiments, the surfactant is cocamidopropyl hydroxysultaine. In some embodiments, the surfactant is about 1% to about 5% by weight of the composition.

In some embodiments of the composition, the weight ratio of the nitrogen gas-generating compound to the surfactant is about 3:1.

In some embodiments of the composition, the curing agent is a linear ethylene amine containing two primary nitrogens and one secondary nitrogen. In some embodiments, the curing agent is diethylenetriamine (DETA). In some embodiments, the curing agent is about 10% to about 13% by weight of the composition.

Also provided in the present disclosure is a foamable resin composition that contains a bisphenol-A-(epichlorohydrin) epoxy resin; azodicarbonamide in an amount of about 5% to about 10% by weight of the composition; a hydroxysultaine surfactant in an amount of about 1% to about 5% by weight of the composition; and a curing agent in an amount of about 10% to about 13% by weight of the composition.

In some embodiments of the composition, the epoxy resin is selected from a bisphenol-A-(epichlorohydrin) epoxy resin with oxirane mono [($C_{12}$-$C_{14}$ alkyloxy)methyl] derivatives and a bisphenol-A-(epichlorohydrin) epoxy resin with 1,6-hexanediol diglycidyl ether.

In some embodiments of the composition, the surfactant is cocamidopropyl hydroxysultaine.

Also provided in the present disclosure is a method of treating a loss circulation zone in a subterranean formation. In some embodiments, the method includes introducing a foamable resin composition into the loss circulation zone, where the foamable resin composition contains an epoxy resin; a nitrogen gas-generating compound; a surfactant; and a curing agent; and forming a foamed resin composition; where the foamed resin composition seals the loss circulation zone.

In some embodiments of the method, the foamed resin composition is formed under downhole conditions. In some embodiments, the downhole conditions comprise temperatures between about 95° F. and about 450° F.

In some embodiments of the method, the epoxy resin comprises a bisphenol-A-(epichlorohydrin) epoxy resin. In some embodiments, the epoxy resin is selected from a bisphenol-A-(epichlorohydrin) epoxy resin with oxirane mono [($C_{12}$-$C_{14}$ alkyloxy)methyl] derivatives and a bisphenol-A-(epichlorohydrin) epoxy resin with 1,6-hexanediol diglycidyl ether. In some embodiments, the epoxy resin is about 75% to about 85% by weight of the composition.

In some embodiments of the method, the nitrogen gas-generating compound is an azo compound. In some embodiments, the azo compound is azodicarbonamide. In some embodiments, the nitrogen gas-generating compound is about 5% to about 15% by weight of the composition.

In some embodiments of the method, the surfactant is a hydroxysultaine. In some embodiments, the surfactant is cocamidopropyl hydroxysultaine. In some embodiments, the surfactant is about 1% to about 5% by weight of the composition.

In some embodiments of the method, the curing agent is diethylenetriamine (DETA). In some embodiments, the curing agent is about 10% to about 13% by weight of the composition.

DESCRIPTION OF DRAWINGS

FIG. 1 shows an epoxy resin composition after curing and being kept for 30 minutes in a 150° F. (65.5° C.) water bath.

FIGS. 2A-2B show an epoxy resin composition containing a surfactant and a nitrogen gas-generating compound immediately after curing (FIG. 2A) and after being kept for 30 minutes in a 150° F. (65.5° C.) water bath (FIG. 2B).

DETAILED DESCRIPTION

Figure 3A:
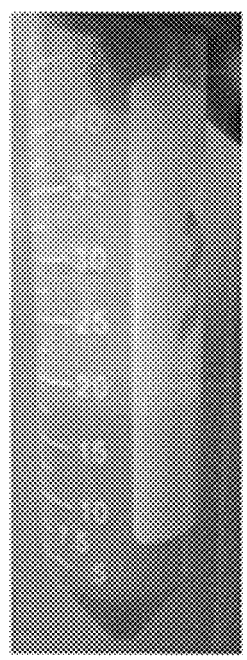
FIGS. 3A-3B show an epoxy resin composition containing a surfactant and a nitrogen gas-generating compound immediately after curing (FIG. 3A) and after being kept for 30 minutes in a 95° F. (35° C.) water bath (FIG. 3B).

The present disclosure provides foamable resin compositions. The foamable resin compositions include an epoxy resin, a nitrogen gas-generating compound, a surfactant, and a curing agent. The foamable resin compositions can be used as a loss circulation material (LCM). The compositions are capable of generating gas in situ under downhole conditions to produce a foamed resin composition, which is expandable. In some embodiments, the nitrogen gas is generated in situ in the loss circulation zone. The expandable nature of the resin compositions allows the LCM to adapt in volume to effectively seal a wide range of fractures with unknown dimensions in subterranean formations. Volume adaptability is introduced in the LCM through in situ generation of nitrogen gas due to decomposition of the nitrogen gas-generating compound under downhole conditions, such as elevated temperatures. The resin compositions of the present disclosure do not contain an activator to generate the nitrogen gas.

The foamed resin compositions of the present disclosure can be used to treat (reduce or eliminate) loss circulation in a subterranean formation, such as a wellbore. Thus, also provided in the present disclosure are methods of controlling loss circulation using the foamable resin compositions. In some embodiments, the use of the foamed resins of the present disclosure decreases the amount of loss circulation material required to plug vugular zones as compared to traditional loss circulation materials that are not able to expand and adapt in volume. Thus, the foamed resin compositions of the present disclosure can be used to cure the losses in vugular zones while using less material than traditional LCMs.

Reference will now be made in detail to certain embodiments of the disclosed subject matter. While the disclosed subject matter will be described in conjunction with the enumerated claims, it will be understood that the exemplified subject matter is not intended to limit the claims to the disclosed subject matter.

Definitions

In this disclosure, the terms "a," "an," and "the" are used to include one or more than one unless the context clearly dictates otherwise. The term "or" is used to refer to a nonexclusive "or" unless otherwise indicated. The statement "at least one of A and B" has the same meaning as "A, B, or A and B." In addition, it is to be understood that the phraseology or terminology employed in this disclosure, and not otherwise defined, is for the purpose of description only and not of limitation. Any use of section headings is intended to aid reading of the document and is not to be interpreted as limiting; information that is relevant to a section heading may occur within or outside of that particular section.

Values expressed in a range format should be interpreted in a flexible manner to include not only the numerical values explicitly recited as the limits of the range, but also to include all the individual numerical values or sub-ranges encompassed within that range as if each numerical value and sub-range is explicitly recited. For example, a range of "about 0.1% to about 5%" or "about 0.1% to 5%" should be interpreted to include not just about 0.1% to about 5%, but also the individual values (for example, 1%, 2%, 3%, and 4%) and the sub-ranges (for example, 0.1% to 0.5%, 1.1% to 2.2%, 3.3% to 4.4%) within the indicated range. The statement "about X to Y" has the same meaning as "about X to about Y," unless indicated otherwise. Likewise, the statement "about X, Y, or about Z" has the same meaning as "about X, about Y, or about Z," unless indicated otherwise.

The term "about" as used herein can allow for a degree of variability in a value or range, for example, within 10%, within 5%, or within 1% of a stated value or of a stated limit of a range.

The term "downhole," as used in the present disclosure, refers to under the surface of the earth, such as a location within or fluidly connected to a wellbore.

As used herein, "downhole conditions" refers to the temperature, pressure, humidity, and other conditions that are commonly found in subterranean formations. In some examples, "downhole conditions" refers to a subterranean formation having a temperature of about 70° F. (or about 21° C.) or higher, such as about 95° F. (or about 35° C.) or higher. In some embodiments, a nitrogen gas-generating compound can begin to decompose under downhole conditions where the temperature is about 70° F. (or about 21° C.) or higher. In some embodiments, a nitrogen gas-generating compound can begin to decompose under downhole conditions where the temperature is about 95° F. (or about 35° C.) or higher.

As used in the present disclosure, the term "subterranean material" or "subterranean formation" can refer to any material under the surface of the earth, including under the surface of the bottom of the ocean. For example, a subterranean formation or material can be any section of a wellbore and any section of a subterranean petroleum- or water-producing formation or region in fluid contact with the wellbore. Placing a material in a subterranean formation can include contacting the material with any section of a wellbore or with any subterranean region in fluid contact therewith. Subterranean materials can include any materials placed into the wellbore such as cement, drill shafts, liners, tubing, casing, or screens; placing a material in a subterranean formation can include contacting with such subterranean materials. In some examples, a subterranean formation or material can be any below-ground region that can produce liquid or gaseous petroleum materials, water, or any section below-ground in fluid contact therewith. For example, a subterranean formation or material can be at least one of an area desired to be fractured, a fracture or an area surrounding a fracture, and a flow pathway or an area surrounding a flow pathway, wherein a fracture or a flow pathway can be optionally fluidly connected to a subterranean petroleum- or water-producing region, directly or through one or more fractures or flow pathways.

In the methods described in the present disclosure, the acts can be carried out in any order, except when a temporal or operational sequence is explicitly recited. Furthermore, specified acts can be carried out concurrently unless explicit claim language recites that they be carried out separately. For example, a claimed act of doing X and a claimed act of doing Y can be conducted simultaneously within a single operation, and the resulting process will fall within the literal scope of the claimed process.

Foamable Resin Compositions

The foamable resin compositions of the present disclosure include an epoxy resin, a nitrogen gas-generating compound, a surfactant, and a curing agent. The resin compositions can be used to control loss circulation in a subterranean formation by acting as loss circulation materials. The foamable resin compositions are provided to a subterranean formation and, under downhole conditions, for example, elevated temperatures, such as about 95° F. (or about 35° C.) or higher, produce nitrogen gas in situ, resulting in an expandable foamed resin composition that effectively seals a wide range of fractures with unknown dimensions. The resin compositions of the present disclosure are able to adapt in volume and shape to effectively plug a wide range of fractures with unknown dimensions.

Epoxy Resin

The foamable resin compositions of the present disclosure include an epoxy resin. In some embodiments, the average molecular weight of the epoxy resin is from about 300 g/mol to about 2000 g/mol. The epoxy resin can be a glycidyl or non-glycidyl resin. In some embodiments, the epoxy resin is a glycidyl resin, such as a glycidyl-ether, glycidyl-ester, or glycidyl-amine resin. In some embodiments, the epoxy resin is a non-glycidyl resin, such as an aliphatic or cycloaliphatic resin. In some embodiments, the epoxy resin is a bisphenol-A-based epoxy resin, bisphenol-F-based epoxy resin, aliphatic epoxy resin, or combination thereof. In some embodiments, the epoxy resin is a bisphenol-A-based resin.

In some embodiments, the epoxy resin is modified with a diluent, such as a reactive or non-reactive diluent. The type and amount of diluent can affect one or more properties of the epoxy resin, including, but not limited to, the viscosity, flexibility, hardness, chemical resistance, mechanical properties, plasticizing effect, reactivity, and crosslinking density. In some embodiments, the diluent is a non-functional, mono-functional, di-functional, or multi-functional reactive diluent. As used herein, a non-functional reactive diluent does not have an epoxide functional group, while a functional reactive diluent has at least one epoxide functional group. The functional reactive diluent can have one, two, three, or more than three epoxide functional groups. Examples of reactive and non-reactive diluents include, but are not limited to, propylene glycol diglycidyl ether, butanediol diglycidyl ether, cardanol glycidyl ether derivatives, propanetriol triglycidyl ether, aliphatic monoglycidyl ethers of $C_{13}$-$C_{15}$ alcohols, or combinations of functional or non-functional reactive diluents and non-reactive diluents. In some embodiments, the epoxy resin is a bisphenol-A-based resin modified with an aliphatic monoglycidyl ether. In some embodiments, the epoxy resin is a bisphenol-A-based resin modified with an aliphatic diglycidyl ether.

In some embodiments, the epoxy resin includes a bisphenol-A-based resin. In some embodiments, the epoxy resin includes a bisphenol-A-based resin modified with a diluent. In some embodiments, the epoxy resin includes a bisphenol-A-(epichlorohydrin) epoxy resin. In some embodiments, the epoxy resin includes a bisphenol-A-(epichlorohydrin) epoxy resin modified with a diluent. In some embodiments, the epoxy resin includes a bisphenol-A-(epichlorohydrin) epoxy resin with oxirane mono [($C_{12}$-$C_{14}$ alkyloxy)methyl] derivatives. The bisphenol-A-epichlorohydrin epoxy resin is an epoxy resin prepared by reaction of bisphenol-A and epichlorohydrin. The bisphenol-A-(epichlorohydrin) epoxy resin can then be modified with the reactive diluent oxirane mono [($C_{12}$-$C_{14}$ alkyloxy)methyl] derivatives. In some embodiments, the epoxy resin includes about 60% to about 100%, about 70% to about 95%, about 80% to about 90%, about 80% to about 88%, about 80% to about 86%, about 80% to about 84%, about 82% to about 90%, about 82% to about 88%, about 82% to about 86%, about 82% to about 84%, about 84% to about 90%, about 84% to about 88%, or about 84% to about 86% bisphenol-A-epichlorohydrin epoxy resin by total weight of the epoxy resin. In some embodiments, the epoxy resin includes about 0% to about 30%, about 10% to about 30%, about 10% to about 20%, about 10% to about 18%, about 10% to about 16%, about 10% to about 14%, about 12% to about 20%, about 12% to about 18%, about 12% to about 16%, about 12% to about 14%, about 14% to about 20%, about 14% to about 18%, or about 14% to about 16% oxirane mono[(C12-C14 alkyloxy)methyl] derivatives by total weight of the epoxy resin. In some embodiments, the epoxy resin includes about 84% to about 86% bisphenol-A-(epichlorohydrin) epoxy resin and about 14% to about 16% oxirane mono [($C_{12}$-$C_{14}$ alkyloxy)methyl] derivatives by total weight of the epoxy resin. The amount of diluent in the epoxy resin can be chosen based on the desired viscosity of epoxy resin composition. For example, the more diluent added to an epoxy resin, the more the viscosity of the resin will be reduced. An exemplary epoxy resin that contains bisphenol-A-(epichlorohydrin) epoxy resin with oxirane mono [(C12-C14 alkyloxy)methyl] derivatives is Razeen® 2254, sold by Jubail Chemical Industries Co. (JANA), Saudi Arabia.

In some embodiments, the epoxy resin that includes the bisphenol-A-(epichlorohydrin) epoxy resin with the reactive diluent oxirane mono [($C_{12}$-$C_{14}$ alkyloxy) methyl] derivatives has an epoxy value of from 4.76 epoxy equivalents per kilogram of epoxy resin to 5.26 epoxy equivalents per kilogram of epoxy resin. The epoxy resin that includes the bisphenol-A-(epichlorohydrin) epoxy resin with the reactive diluent oxirane mono [($C_{12}$-$C_{14}$ alkyloxy)methyl] derivatives can have an epoxy equivalent weight of 190 g/eq to 210 g/eq and a dynamic viscosity of 600 milliPascal seconds (mPa·s) to 900 mPa·s.

In some embodiments, the epoxy resin includes a bisphenol-A-(epichlorohydrin) epoxy resin with 1,6-hexanediol diglycidyl ether. The bisphenol-A-epichlorohydrin epoxy resin is an epoxy resin prepared by reaction of bisphenol-A and epichlorohydrin. The bisphenol-A-(epichlorohydrin) epoxy resin can then be modified with the reactive diluent 1,6-hexanediol diglycidyl ether. In some embodiments, the epoxy resin includes about 60% to about 100%, about 60% to about 95%, about 60% to about 90%, about 60% to about 85%, about 60% to about 80%, about 60% to about 75%, about 60% to about 70%, about 60% to about 65%, about 65% to about 100%, about 65% to about 95%, about 65% to about 90%, about 65% to about 85%, about 65% to about 80%, about 65% to about 75%, about 65% to about 70%, about 70% to about 100%, about 70% to about 95%, about 70% to about 90%, about 70% to about 85%, about 70% to about 80%, about 70% to about 75%, about 75% to about 100%, about 75% to about 95%, about 75% to about 90%, about 75% to about 85%, about 75% to about 80%, about 80% to about 100%, about 80% to about 95%, about 80% to about 90%, about 80% to about 85%, about 85% to about 100%, about 85% to about 95%, about 85% to about 90%, about 90% to about 100%, about 90% to about 95%, or about 95% to about 100% bisphenol-A-epichlorohydrin epoxy resin by total weight of the epoxy resin. In some embodiments, the epoxy resin includes about 0% to about 30%, about 10% to about 30%, about 10% to about 25%, about 10% to about 20%, about 10% to about 15%, about 15% to about 30%, about 15% to about 25%, about 15% to about 20%, about 20% to about 30%, about 20% to about 25%, about 25% to about 30% 1,6-hexanediol diglycidyl ether by total weight of the epoxy resin. The amount of diluent in the epoxy resin can be chosen based on the desired viscosity of epoxy resin composition. For example, the more diluent added to an epoxy resin, the more the viscosity of the resin will be reduced. In some embodiments, the epoxy resin includes about 60% to about 100% bisphenol-A-(epichlorohydrin) epoxy resin and about 0% to about 30% 1,6-hexanediol diglycidyl ether by total weight of the epoxy resin. An exemplary epoxy resin that contains bisphenol-A-(epichlorohydrin) epoxy resin with 1,6-hexanediol diglycidyl ether is Razeen® 2253, sold by Jubail Chemical Industries Co. (JANA), Saudi Arabia.

In some embodiments, the epoxy resin that includes the bisphenol-A-(epichlorohydrin) epoxy resin with the reactive diluent 1,6-hexanediol diglycidyl ether has an epoxy value of from 5.40 epoxy equivalents per kilogram of epoxy resin to 5.81 epoxy equivalents per kilogram of epoxy resin. The epoxy resin that includes the bisphenol-A-(epichlorohydrin) epoxy resin with the reactive diluent 1,6-hexanediol diglycidyl ether can have an epoxy equivalent weight of 172 g/eq to 185 g/eq and a dynamic viscosity of from 800 mPa·s to 1400 mPa·s.

In some embodiments, the foamable resin composition includes an epoxy resin in an amount of about 65% to about 99% by weight of the composition. For example, the epoxy resin can be about 70% to about 99% by weight of the composition, such as about 70% to about 95%, about 70% to about 90%, about 70% to about 85%, about 70% to about 80%, about 70% to about 75%, about 75% to about 99%, about 75% to about 95%, about 75% to about 90%, about 75% to about 85%, about 75% to about 80%, about 80% to about 99%, about 80% to about 95%, about 80% to about 90%, about 80% to about 85%, about 85% to about 99%, about 85% to about 95%, about 85% to about 90%, about 90% to about 99%, about 90% to about 95%, about 95% to about 99%, or about 65%, 70%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, or about 99% by weight of the composition. In some embodiments, the composition contains about 75% to about 85% epoxy resin by weight of the composition. In some embodiments, the composition contains about 77% to about 78% epoxy resin by weight of the composition. In some embodiments, the composition contains about 77.9% epoxy resin by weight of the composition. In some embodiments, the epoxy resin is bisphenol-A-(epichlorohydrin) epoxy resin with oxirane mono [($C_{12}$-$C_{14}$ alkyloxy)methyl] derivatives. In some embodiments, the epoxy resin is bisphenol-A-(epichlorohydrin) epoxy resin with 1,6-hexanediol diglycidyl ether.

Nitrogen Gas-Generating Compound

The foamable resin compositions of the present disclosure contain a nitrogen gas-generating compound. Examples of suitable nitrogen gas-generating compounds include, but are not limited to, compounds containing hydrazine or azo groups, for example, hydrazine, azodicarbonamide, azobis (isobutyronitrile), p-toluene sulfonyl hydrazide, p-toluene sulfonyl semicarbazide, carbohydrazide, 4,4'-oxybis (benzenesulfonylhydrazide), and mixtures thereof. Other suitable nitrogen gas-generating compounds which do not contain hydrazine or azo groups include, but are not limited to, ammonium salts of organic or inorganic acids, hydroxylamine sulfate, carbamide and mixtures thereof.

In some embodiments, the nitrogen gas-generating compound included in the foamable resin compositions of the present disclosure is an azo compound. In some embodiments the azo compound is a derivative of azodicarboxylic acid with the formula:

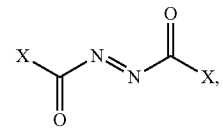

where X is independently selected from $NH_2$, a monoalkylamino group, a dialkylamino group, OH, O-$M^{n+}$ (where $M^{n+}$ is an alkali or alkaline earth metal), alkyl, aryl, or an alkoxy group. In some embodiments, the azodicarboxylic acid derivative is selected from an amide derivative, an ester derivative, and an alkali salt of the carboxylic derivative. In some embodiments, the nitrogen gas-generating azodicarboxylic acid derivative is azodicarbonamide (AZDC) with the structure:

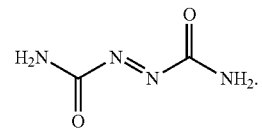

In some embodiments, the nitrogen gas-generating azodicarboxylic acid derivative is an ester represented selected from diisopropyl azodicarboxylate (DIAD) and diethyl azodicarboxylate (DEAD) represented by the structures:

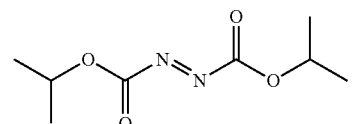

DIAD

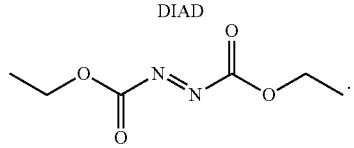

DEAD

Other exemplary nitrogen gas-generating compounds include, but are not limited to, oxybis(benzenesulfonyl hydrazide, p-toluenesulfonyl hydrazide, p-toluenesulfonyl semicarbazide, and 5-phenyltetrazole.

In some embodiments, the foamable resin composition includes a nitrogen gas-generating compound in an amount of about 0.1% to about 20% by weight of the composition. For example, the nitrogen gas-generating compound can be about 1% to about 20% by weight of the composition, such as about 1% to about 15%, about 1% to about 14%, about 1% to about 13%, about 1% to about 12%, about 1% to about 11%, about 1% to about 10%, about 1% to about 9%, about 1% to about 8%, about 1% to about 7%, about 1% to about 6%, about 1% to about 5%, about 1% to about 2%, about 2% to about 20%, about 2% to about 15%, about 2% to about 14%, about 2% to about 13%, about 2% to about 12%, about 2% to about 11%, about 2% to about 10%, about 2% to about 9%, about 2% to about 8%, about 2% to about 7%, about 2% to about 6%, about 2% to about 5%, about 5% to about 20%, about 5% to about 15%, about 5% to about 14%, about 5% to about 13%, about 5% to about 12%, about 5% to about 11%, about 5% to about 10%, about 5% to about 9%, about 5% to about 8%, about 5% to about 7%, about 5% to about 6%, about 6% to about 20%, about 6% to about 15%, about 6% to about 14%, about 6% to about 13%, about 6% to about 12%, about 6% to about 11%, about 6% to about 10%, about 6% to about 9%, about 6% to about 8%, about 6% to about 7%, about 7% to about 20%, about 7% to about 15%, about 7% to about 14%, about 7% to about 13%, about 7% to about 12%, about 7% to about 11%, about 7% to about 10%, about 7% to about 9%, about 7% to about 8%, about 8% to about 20%, about 8% to about 15%, about 8% to about 14%, about 8% to about 13%, about 8% to about 12%, about 8% to about 11%, about 8% to about 10%, about 8% to about 9%, about 9% to about 20%, about 9% to about 15%, about 9% to about 14%, about 9% to about 13%, about 9% to about 12%, about 9% to about 11%, about 9% to about 10%, about 10% to about 20%, about 10% to about 15%, about 10% to about 14%, about 10% to about 13%, about 10% to about 12%, about 10% to about 11%, about 11% to about 20%, about 11% to about 15%, about 11% to about 14%, about 11% to about 13%, about 11% to about 12%, about 12% to about 20%, about 12% to about 15%, about 12% to about 14%, about 12% to about 13%, about 13% to about 20%, about 13% to about 15%, about 13% to about 14%, about 14% to about 20%, about 14% to about 15%, about 15% to about 20%, or about 0.1%, 0.5%, 1%, 1.5%, 2%, 2.5%, 3%, 3.5%, 4%, 4.5%, 5%, 5.5%, 6%, 6.5%, 7%, 7.5%, 7.8%, 8%, 8.5%, 9%, 9.5%, 10%, 10.5%, 11%, 12%, 13%, 14%, 15%, 16%, 17%, 18%, 19%, or about 20% by weight of the composition. In some embodiments, the composition contains about 5% to about 10% nitrogen gas-generating compound by weight of the composition. In some embodiments, the composition contains about 7% to about 8% nitrogen gas-generating compound by weight of the composition. In some embodiments, the composition contains about 7.8% nitrogen gas-generating compound by weight of the composition. In some embodiments, the nitrogen gas-generating compound is azodicarbonamide.

In some embodiments, the amount of gas generated in the foamable resin composition causes the volume of the foamable composition to increase and expand. For example, the volume of the resin after decomposition of the nitrogen gas-generating compound can increase by about 1% to about 500% or more, such as about 10% to about 400%, or about 50% to about 300%, or about 100% to about 200%, such as about 1%, 10%, 25%, 50%, 75%, 100%, 125%, 150%, 175%, 185%, 200%, 250%, 300%, 350%, 400%, 450%, 500%, or more. In some embodiments, the volume of the resin after decomposition of the nitrogen gas-generating compound increase by about 100% to about 200%. In some embodiments, the volume of the resin after decomposition of the nitrogen gas-generating compound increase by about 185%.

In some embodiments, the extent of foaming, or the volume of gas generated, of the foamable resin compositions of the present disclosure is controlled by varying the amount of nitrogen gas-generating compound. For example, addition of higher amounts of nitrogen gas-generating compound can lead to increased nitrogen gas generation. In some embodiments, the extent of foaming, or the volume of gas generated, of the foamable resin compositions of the present disclosure is controlled by varying the amount of surfactant and nitrogen gas-generating compound.

Surfactant

The foamable resin compositions of the present disclosure contain a surfactant. The composition can contain a single surfactant or a combination of two or more surfactants. Any type of surfactant can be used in the compositions of the present disclosure, including, for example, cationic surfactants, anionic surfactants, amphoteric (zwitterionic) surfactants, nonionic surfactants, and mixtures thereof. In some embodiments, the surfactant is an amphoteric surfactant.

Examples of suitable surfactants that can be used in the foamable resin compositions of the present disclosure include, but are not limited to, alkyl polyglycol ethers, alkylaryl polyglycol ethers, ethylene oxide/propylene oxide (EO/PO) block copolymers, fatty acid polyglycol esters, polyglycol ethers of hydroxyl-containing triglycerides (for example, castor oil), alkylpolyglycosides, fatty esters of glycerol, sorbitol, or pentaerythritol, amine oxides (for example, dodecyldimethylamine oxide), alkyl sulfates, alkyl ether sulfates, sulfonates, for example, alkyl sulfonates and alkylaryl sulfonates, alkali metal salts or ammonium salts of a carboxylic acid or poly(alkylene glycol) ether carboxylic acid, partial phosphoric esters or the corresponding alkali metal salt or ammonium salt, for example, an alkyl and alkaryl phosphate, an alkylether phosphate, or an alkaryleether phosphate, salts of primary, secondary, or tertiary fatty amines, quaternary alkyl- and alkylbenzylammonium salts, alkylpyridinium salts, alkylimidazolinium salts, alkyloxazolinium salts, sultaines (for example, cocamidopropyl hydroxysultaine), betaines (for example, cocamidopropyl betaine), phosphates (for example, lecithin), and combinations thereof.

Examples of anionic surfactants include, but are not limited to, an alkyl sulfate, an alkyl ether sulfate, an alkyl ester sulfonate, an alpha olefin sulfonate, a linear alkyl benzene sulfonate, a branched alkyl benzene sulfonate, a linear dodecylbenzene sulfonate, a branched dodecylbenzene sulfonate, an alkyl benzene sulfonic acid, a dodecylbenzene sulfonic acid, a sulfosuccinate, a sulfated alcohol, an ethoxylated sulfated alcohol, an alcohol sulfonate, an ethoxylated and propoxylated alcohol sulfonate, an alcohol ether sulfate, an ethoxylated alcohol ether sulfate, a propoxylated alcohol sulfonate, a sulfated nonyl phenol, an ethoxylated and propoxylated sulfated nonyl phenol, a sulfated octyl phenol, an ethoxylated and propoxylated sulfated octyl phenol, a sulfated dodecyl phenol, and an ethoxylated and propoxylated sulfated dodecyl phenol. Other anionic surfactants include ammonium lauryl sulfate, sodium lauryl sulfate (sodium dodecyl sulfate, SLS, or SDS), and related alkyl-ether sulfates sodium laureth sulfate (sodium lauryl ether sulfate or SLES), sodium myreth sulfate, docusate (dioctyl sodium sulfosuccinate), perfluorooctanesulfonate (PFOS), perfluorobutanesulfonate, alkyl-aryl ether phosphates, and alkyl ether phosphates.

Examples of cationic surfactants include, but are not limited to, octenidine dihydrochloride, cetrimonium bromide (CTAB), cetylpyridinium chloride (CPC), benzalkonium chloride (BAC), benzethonium chloride (BZT), dimethyldioctadecylammonium chloride, and dioctadecyldimethylammonium bromide (DODAB).

Examples of amphoteric (zwitterionic) surfactants include, but are not limited to, 3-[(3-cholamidopropyl)dimethylammonio]-1-propanesulfonate (CHAPS), cocamidopropyl hydroxysultaine, ocamidopropyl betaine, phospholipids, and sphingomyelins. In some embodiments, the surfactant is cocamidopropyl hydroxysultaine.

Examples of nonionic surfactants include, but are not limited to, long chain alcohols that exhibit surfactant properties, such as cetyl alcohol, stearyl alcohol, cetostearyl alcohol, oleyl alcohol, and other fatty alcohols. Other long chain alcohols with surfactant properties include polyethylene glycol alkyl ethers, such as octaethylene glycol monododecyl ether and pentaethylene glycol monododecyl ether; polypropylene glycol alkyl ethers; glucoside alkyl ethers, such as decyl glucoside, lauryl glucoside, and octyl glucoside; polyethylene glycol octylphenyl ethers, such as Triton X-100; polyethylene glycol alkylphenyl ethers, such as nonoxynol-9; glycerol alkyl esters, such as glyceryl laurate; polyoxyethylene glycol sorbitan alkyl esters, such as polysorbate, sorbitan alkyl esters, cocamide MEA, cocamide DEA, dodecyldimethylamine oxide, block copolymers of polyethylene glycol and polypropylene glycol, such as poloxamers, and polyethoxylated tallow amine (POEA).

In some embodiments, the surfactant is in an aqueous solution. In some embodiments, the surfactant is present in an amount of about 30 wt% to about 50 wt % in an aqueous solution. In some embodiments, the surfactant is about 30% to about 50% by weight of the aqueous solution. For example, the surfactant can be about 30%, 35%, 40%, 45%, or about 50% by weight of the aqueous solution. In some embodiments, the surfactant is an aqueous solution containing a hydroxysultaine. In some embodiments, the surfactant is an aqueous solution containing cocamidopropyl hydroxysultaine. In some embodiments, the surfactant is a 43 wt % solution of cocamidopropyl hydroxysultaine in water. An exemplary aqueous solution of cocamidopropyl hydroxysultaine is PETROSTEP® SB, sold by Stepan Company (Northfield, Ill., USA).

In some embodiments, the foamable resin composition includes a surfactant in an amount of about 0.1% to about 5% by weight of the composition. For example, the surfactant can be about 0.5% to about 5% by weight of the composition, such as about 0.5% to about 4.5%, about 0.5% to about 4%, about 0.5% to about 3.5%, about 0.5% to about 3%, about 0.5% to about 2.5%, about 0.5% to about 2%, about 0.5% to about 1.5%, about 0.5% to about 1%, about 1% to about 5%, about 1% to about 4.5%, about 1% to about 4%, about 1% to about 3.5%, about 1% to about 3%, about 1% to about 2.5%, about 1% to about 2%, about 1% to about 1.5%, about 1.5% to about 5%, about 1.5% to about 4.5%, about 1.5% to about 4%, about 1.5% to about 3.5%, about 1.5% to about 3%, about 1.5% to about 2.5%, about 1.5% to about 2%, about 2% to about 5%, about 2% to about 4.5%, about 2% to about 4%, about 2% to about 3.5%, about 2% to about 3%, about 2% to about 2.5%, about 2.5% to about 5%, about 2.5% to about 4.5%, about 2.5% to about 4%, about 2.5% to about 3.5%, about 2.5% to about 3%, about 3% to about 5%, about 3% to about 4.5%, about 3% to about 4%, about 3% to about 3.5%, about 3.5% to about 5%, about 3.5% to about 4.5%, about 3.5% to about 4%, about 4% to about 5%, about 4% to about 4.5%, about 4.5% to about 5%, or about 0.1%, 0.5%, 1%, 1.5%, 2%, 2.5%, 2.6%, 3%, 3.5%, 4%, 4.5%, or about 5% by weight of the composition. In some embodiments, the composition contains about 2% to about 3% surfactant by weight of the composition. In some embodiments, the composition contains about 2.6% surfactant by weight of the composition. In some embodiments, the surfactant is cocamidopropyl hydroxysultaine. In some embodiments, the surfactant is an aqueous solution of cocamidopropyl hydroxysultaine.

In some embodiments, the weight ratio of the nitrogen gas-generating compound to the surfactant is about 5:1 to about 1:5, such as about 4:1 to about 1:4, about 3:1 to about 1:3, about 2:1 to about 1:2, or about 1:1. For example, the weight ratio of the nitrogen gas-generating compound to the surfactant can be about 5:1, about 4.5:1, about 4:1, about 3.5:1, about 3:1, about 2.5:1, about 2:1, about 1.5:1, about 1:1, about 1:1.5, about 1:2, about 1:2.5, about 1:3, about 1:3.5, about 1:4, about 1:4.5, or about 1:5. In some embodiments, the ratio of nitrogen gas-generating compound to surfactant is about 3:1. In some embodiments, the nitrogen gas-generating compound is an azo compound. In some embodiments, the azo compound is azodicarbonamide. In some embodiments, the surfactant is a sultaine. In some embodiments, the surfactant is cocamidopropyl hydroxysultaine. In some embodiments, the composition contains azodicarbonamide and cocamidopropyl hydroxysultaine in a weight ratio of about 3:1.

In some embodiments, the extent of foaming, or the volume of gas generated, of the foamable resin compositions of the present disclosure is controlled by varying the amount of surfactant. In some embodiments, the extent of foaming, or the volume of gas generated, of the foamable resin compositions of the present disclosure is controlled by varying the amount of surfactant and nitrogen gas-generating compound.

Curing Agent

The foamable resin compositions of the present disclosure contain a curing agent to cure the epoxy resin. The curing agent can include at least one of an amine, polyamine, amine adduct, polyamine adduct, alkanolamine, amide, polyamide, polyamide adduct, polyamide imidazoline, polyaminoamides, phenalkamine, or combinations thereof. Amines or polyamine curing agents include, but are not limited to, aromatic amines, aliphatic amines, cycloaliphatic amines, modified cycloaliphatic amines such as cycloaliphatic amines modified by polyacrylic acid, aliphatic polyamines, cycloaliphatic polyamines, modified polyamines such as polyamines modified by polyacrylic acid, or amine adducts such as cycloaliphatic amine adducts or polyamine adducts. In some embodiments, the curing agent is an ethylene amine. In some embodiments, the curing agent is a linear ethylene amine containing two primary nitrogens and one secondary nitrogen.

In some embodiments, the curing agent includes at least one of trimethyl hexamethylene diamine (TMD), diethylenetriamine (DETA), triethylenetetramine (TETA), meta-xylenediamine (MXDA), aminoethylpiperazine (AEP), tetraethylenepentamine (TEPA), polyetheramine, isophoronediamine (IPDA), or beta-hydroxyalkyl amide (HAA). In some embodiments, the curing agent is DETA. An exemplary curing agent is Razeencure® 931, a linear ethylene amine containing two primary nitrogens and one secondary nitrogen, sold by Jubail Chemical Industries Co. (JANA), Saudi Arabia.

In some embodiments, the curing agent has an amine value that enables the amine curing agent to fully cure the epoxy resin. The amine value of a curing agent gives the active hydrogen (NH) content of an amine curing agent. The amine value is expressed as the weight in milligrams of potassium hydroxide (KOH) needed to neutralize the NH in 1 gram of the amine curing agent. In some embodiments, the curing agent has an amine value of from 250 milligrams of KOH per gram (mg KOH/g) to 1700 mg KOH/g, from 250 mg KOH/g to 1650 mg KOH/g, from 250 mg KOH/g to 1600 mg KOH/g, from 450 mg KOH/g to 1700 mg KOH/g, from 450 mg KOH/g to 1650 mg KOH/g, from 450 mg KOH/g to 1600 mg KOH/g, from 650 mg KOH/g to 1700 mg KOH/g, from 650 mg KOH/g to 1650 mg KOH/g, or from 650 mg KOH/g to 1600 mg KOH/g.

In some embodiments, the foamable resin composition includes a curing agent in an amount of about 1% to about 15% by weight of the composition. For example, the curing agent can be about 5% to about 15% by weight of the composition, such as about 5% to about 13%, about 5% to about 12%, about 5% to about 11%, about 5% to about 10%, about 5% to about 9%, about 5% to about 8%, about 5% to about 7%, about 5% to about 6%, about 6% to about 15%, about 6% to about 13%, about 6% to about 12%, about 6% to about 11%, about 6% to about 10%, about 6% to about 9%, about 6% to about 8%, about 6% to about 7%, about 7% to about 15%, about 7% to about 13%, about 7% to about 12%, about 7% to about 11%, about 7% to about 10%, about 7% to about 9%, about 7% to about 8%, about 8% to about 15%, about 8% to about 13%, about 8% to about 12%, about 8% to about 11%, about 8% to about 10%, about 8% to about 9%, about 9% to about 15%, about 9% to about 13%, about 9% to about 12%, about 9% to about 11%, about 9% to about 10%, about 10% to about 15%, about 10% to about 13%, about 10% to about 12%, about 10% to about 11%, about 11% to about 15%, about 11% to about 13%, about 11% to about 12%, about 12% to about 15%, about 12% to about 13%, about 13% to about 15%, or about 1%, 2%, 3%, 4%, 5%, 6%, 7%, 8%, 9%, 10%, 11%, 11.7%, 12%, 13%, 14%, or about 15% by weight of the composition. In some embodiments, the composition contains about 10% to about 13% curing agent by weight of the composition. In some embodiments, the composition contains about 11.7% curing agent by weight of the composition. In some embodiments, the curing agent is diethylenetriamine (DETA).

In some embodiments, the thickening or gelling time of the foamable resin compositions of the present disclosure under downhole conditions is controlled by varying the amount of the curing agent.

Other Components

The foamable resin compositions of the present disclosure can contain one or more additional components, including, but not limited to diluents, viscosifiers, retarders, and accelerators.

Exemplary Compositions

Provided in the present disclosure are foamable resin compositions. The foamable resin compositions include an epoxy resin, a nitrogen gas-generating compound, a surfactant, and a curing agent. The compositions are capable of generating gas in situ under downhole conditions to produce a foamed resin composition, for example, in subterranean formations where the temperature is about 95° F. (or about 35° C.) or higher. The foamable compositions of the present disclosure do not include an activator to generate the nitrogen gas. The foamed resin compositions of the present disclosure can be used to treat (reduce or eliminate) loss circulation in a subterranean formation, such as a wellbore. In some embodiments, the use of the foamed resins of the present disclosure decreases the amount of loss circulation material required to plug vugular zones as compared to traditional loss circulation materials that are not able to expand and adapt in volume. Thus, the foamed resin compositions of the present disclosure can be used to cure the losses in vugular zones.

Thus, provided in the present disclosure is a foamable resin composition containing about 65 wt % to about 99 wt % of an epoxy resin; about 0.1 wt % to about 20 wt % of a nitrogen gas-generating compound; about 0.1 wt % to about 5 wt % of a surfactant; and about 1 wt % to about 15 wt % of a curing agent. In some embodiments, the epoxy resin is a bisphenol-A-(epichlorohydrin) epoxy resin. In some embodiments, the epoxy resin is a bisphenol-A-(epichlorohydrin) epoxy resin with 1,6-hexanediol diglycidyl ether. In some embodiments, the epoxy resin is a bisphenol-A-(epichlorohydrin) epoxy resin with oxirane mono [($C_{12}$-$C_{14}$ alkyloxy)methyl] derivatives. In some embodiments, the nitrogen gas-generating compound is an azo compound. In some embodiments, the nitrogen gas-generating compound is azodicarbonamide. In some embodiments, the surfactant is a hydroxysultaine. In some embodiments, the surfactant is cocamidopropyl hydroxysultaine. In some embodiments, the curing agent is an ethylene amine. In some embodiments, the curing agent is diethylenetriamine (DETA).

In some embodiments, the foamable resin composition contains about 75 wt % to about 85 wt % of an epoxy resin; about 5 wt % to about 10 wt % of a nitrogen gas-generating compound; about 2 wt % to about 3 wt % of a surfactant; and about 10 wt % to about 13 wt % of a curing agent. In some embodiments, the epoxy resin is a bisphenol-A-(epichlorohydrin) epoxy resin. In some embodiments, the epoxy resin is a bisphenol-A-(epichlorohydrin) epoxy resin with 1,6-hexanediol diglycidyl ether. In some embodiments, the epoxy resin is a bisphenol-A-(epichlorohydrin) epoxy resin with oxirane mono [($C_{12}$-$C_{14}$ alkyloxy)methyl] derivatives. In some embodiments, the nitrogen gas-generating compound is an azo compound. In some embodiments, the nitrogen gas-generating compound is azodicarbonamide. In some embodiments, the surfactant is a hydroxysultaine. In some embodiments, the surfactant is cocamidopropyl hydroxysultaine. In some embodiments, the curing agent is an ethylene amine. In some embodiments, the curing agent is diethylenetriamine (DETA).

In some embodiments, the foamable resin composition contains about 77.9 wt % of an epoxy resin; about 7.8 wt % of a nitrogen gas-generating compound; about 2.6 wt % of a surfactant; and about 11.7 wt % of a curing agent. In some embodiments, the epoxy resin is a bisphenol-A-(epichlorohydrin) epoxy resin. In some embodiments, the epoxy resin is a bisphenol-A-(epichlorohydrin) epoxy resin with 1,6-hexanediol diglycidyl ether. In some embodiments, the epoxy resin is a bisphenol-A-(epichlorohydrin) epoxy resin with oxirane mono [($C_{12}$-$C_{14}$ alkyloxy)methyl] derivatives. In some embodiments, the nitrogen gas-generating compound is an azo compound. In some embodiments, the nitrogen gas-generating compound is azodicarbonamide. In some embodiments, the surfactant is a hydroxysultaine. In some embodiments, the surfactant is cocamidopropyl hydroxysultaine. In some embodiments, the curing agent is an ethylene amine. In some embodiments, the curing agent is diethylenetriamine (DETA).

Also provided in the present disclosure is a foamable resin composition containing about 65 wt % to about 99 wt % of a bisphenol-A-(epichlorohydrin) epoxy resin; about 0.1 wt % to about 20 wt % of an azo compound; about 0.1 wt % to about 5 wt % of a hydroxysultaine surfactant; and about 1 wt % to about 15 wt % of an ethylene amine curing agent.

In some embodiments, the foamable resin composition contains about 75 wt % to about 85 wt % of a bisphenol-A-(epichlorohydrin) epoxy resin; about 5 wt % to about 10 wt % of an azo compound; about 2 wt % to about 3 wt % of a hydroxysultaine surfactant; and about 10 wt % to about 13 wt % of an ethylene amine curing agent.

In some embodiments, the foamable resin composition contains about 77.9 wt % of a bisphenol-A-(epichlorohydrin) epoxy resin; about 7.8 wt % of an azo compound; about 2.6 wt % of a hydroxysultaine surfactant; and about 11.7 wt % of an ethylene amine curing agent.

Also provided in the present disclosure is a foamable resin composition containing about 65 wt % to about 99 wt % of a bisphenol-A-(epichlorohydrin) epoxy resin with oxirane mono [($C_{12}$-$C_{14}$ alkyloxy)methyl] derivatives; about 0.1 wt % to about 20 wt % of azodicarbonamide; about 0.1 wt % to about 5 wt % of cocamidopropyl hydroxysultaine; and about 1 wt % to about 15 wt % of diethylenetriamine (DETA).

In some embodiments, the foamable resin composition contains about 75 wt % to about 85 wt % of a bisphenol-A-(epichlorohydrin) epoxy resin with oxirane mono [($C_{12}$-$C_{14}$ alkyloxy)methyl] derivatives; about 5 wt % to about 10 wt % of azodicarbonamide; about 2 wt % to about 3 wt % of cocamidopropyl hydroxysultaine; and about 10 wt % to about 13 wt % of diethylenetriamine (DETA).

In some embodiments, the foamable resin composition contains about 77.9 wt % of a bisphenol-A-(epichlorohydrin) epoxy resin with oxirane mono [($C_{12}$-$C_{14}$ alkyloxy)methyl] derivatives; about 7.8 wt % of azodicarbonamide; about 2.6 wt % of cocamidopropyl hydroxysultaine; and about 11.7 wt % of diethylenetriamine (DETA).

Also provided in the present disclosure is a foamable resin composition containing about 65 wt % to about 99 wt % of a bisphenol-A-(epichlorohydrin) epoxy resin with 1,6-hexanediol diglycidyl ether; about 0.1 wt % to about 20 wt % of azodicarbonamide; about 0.1 wt % to about 5 wt % of cocamidopropyl hydroxysultaine; and about 1 wt % to about 15 wt % of diethylenetriamine (DETA).

In some embodiments, the foamable resin composition contains about 75 wt % to about 85 wt % of a bisphenol-A-(epichlorohydrin) epoxy resin with 1,6-hexanediol diglycidyl ether; about 5 wt % to about 10 wt % of azodicarbonamide; about 2 wt % to about 3 wt % of cocamidopropyl hydroxysultaine; and about 10 wt % to about 13 wt % of diethylenetriamine (DETA).

In some embodiments, the foamable resin composition contains about 77.9 wt % of a bisphenol-A-(epichlorohydrin) epoxy resin with 1,6-hexanediol diglycidyl ether; about 7.8 wt % of azodicarbonamide; about 2.6 wt % of cocamidopropyl hydroxysultaine; and about 11.7 wt % of diethylenetriamine (DETA).

In some embodiments, the foamable resin composition contains a bisphenol-A-(epichlorohydrin) epoxy resin; azodicarbonamide in an amount of about 5% to about 10% by weight of the composition; a hydroxysultaine surfactant in an amount of about 1% to about 5% by weight of the composition; and a curing agent in an amount of about 10% to about 13% by weight of the composition. In some embodiments, the epoxy resin is about 75% to about 85% by weight of the composition. In some embodiments, the epoxy resin is selected from a bisphenol-A-(epichlorohydrin) epoxy resin with oxirane mono [($C_{12}$-$C_{14}$ alkyloxy)methyl] derivatives and a bisphenol-A-(epichlorohydrin) epoxy resin with 1,6-hexanediol diglycidyl ether. In some embodiments, the epoxy resin is a bisphenol-A-(epichlorohydrin) epoxy resin with oxirane mono [($C_{12}$-$C_{14}$ alkyloxy)methyl] derivatives. In some embodiments, the epoxy resin is a bisphenol-A-(epichlorohydrin) epoxy resin with 1,6-hexanediol diglycidyl ether. In some embodiments, the surfactant is cocamidopropyl hydroxysultaine. In some embodiments, the curing agent is a linear ethylene amine containing two primary nitrogens and one secondary nitrogen. In some embodiments, the curing agent is diethylenetriamine (DETA).

Methods for Controlling Loss Circulation

Additionally, provided in this disclosure is a method of treating a loss circulation zone in a subterranean formation. In some embodiments, the method includes introducing a foamable resin composition, such as a foamable resin composition of the present disclosure, into a loss circulation zone and forming a foamed resin composition. In some embodiments, the method includes introducing a foamable epoxy resin composition into the subterranean formation and forming a foamed resin composition, where the foamed resin composition seals the loss circulation zone. In some embodiments, the nitrogen gas is generated in situ in the loss circulation zone. In some embodiments, the foamable epoxy resin composition is placed within the loss circulation zone via a wellbore. In some embodiments, the composition includes an epoxy resin, a nitrogen gas-generating compound, a surfactant, and a curing agent, such as the compositions provided in the present disclosure. In some embodiments, the composition does not contain an activator for generating nitrogen gas.

In some embodiments, the method includes introducing the foamable resin composition to a portion of the wellbore experiencing loss circulation to remediate the portion of the wellbore.

The foamable resin compositions can be used for remediating or treating a wellbore, such as a loss circulation zone, under a range of different downhole conditions in the wellbore. In some embodiments, the foamable resin compositions are adapted to different downhole conditions by changing the concentrations of the epoxy resin, nitrogen gas-generating compound, curing agent, surfactant to modify the viscosity, mechanical properties, curing time, or other properties of the resin composition.

In some embodiments of the methods of the present disclosure, the foamed resin composition is formed under downhole conditions. In some embodiments, the nitrogen gas-generating compound of the foamable resin compositions of the present disclosure decomposes under downhole conditions, thus forming nitrogen gas and thereby producing a foamed resin composition. The foamable resin compositions can be used at temperatures ranging from about 70° F. to about 450° F., such as about 70° F. to about 400° F., about 70° F. to about 350° F., about 70° F. to about 300° F., about 70° F. to about 250° F., about 70° F. to about 200° F., about 70° F. to about 150° F., about 70° F. to about 100° F., about 70° F. to about 95° F., about 95° F. to about 450° F., about 95° F. to about 400° F., about 95° F. to about 350° F., about 95° F. to about 300° F., about 95° F. to about 250° F., about 95° F. to about 200° F., about 95° F. to about 150° F., about 95° F. to about 100° F., about 150° F. to about 450° F., about 150° F. to about 400° F., about 150° F. to about 350° F., about 150° F. to about 300° F., about 150° F. to about 250° F., about 150° F. to about 200° F., about 200° F. to about 450° F., about 200° F. to about 400° F., about 200° F. to about 350° F., about 200° F. to about 300° F., about 200° F. to about 250° F., about 250° F. to about 450° F., about 250° F. to about 400° F., about 250° F. to about 350° F., about 250° F. to about 300° F., about 300° F. to about 450° F., about 300° F. to about 400° F., about 300° F. to about 350° F., about 350° F. to about 450° F., about 350° F. to about 400° F., or about 400° F. to about 450° F. In some embodiments, the foamed resin compositions are formed at elevated temperatures, such as at temperatures at or above about 70° F. or at or above about 95° F. or at or above about 150° F., or up to about 450° F. In some embodiments, the foamed resin compositions are formed at temperatures at or about 95° F., such about 100° F., 105° F., 110° F., 115° F., 120° F., 125° F., 130° F., 135° F., 140° F., 145° F., 150° F., 155° F., 160° F., 165° F., 170° F., 175° F., 200° F., 225° F., 250° F., 275° F., 300° F., 325° F., 350° F., 375° F., 400° F., 425° F., 450° F., or higher. In some embodiments, the foamed resin composition forms at a temperature of about 70° F. In some embodiments, the foamed resin composition forms at a temperature of about 95° F. In some embodiments, the foamed resin composition forms at a temperature of about 150° F. In some embodiments, the foamed resin composition forms at a temperature up to about 450° F.

Also provided herein is a method of servicing a loss circulation zone. In some embodiments, the loss circulation zone is fluidly connected to a wellbore. The method includes providing a foamable resin composition including an epoxy resin; a nitrogen gas-generating compound; a surfactant; and a curing agent, within a portion of a subterranean formation containing the loss circulation zone; and forming a foamed resin composition.

In some embodiments of the methods of the present disclosure, the composition is introduced into a subterranean formation containing the loss circulation zone using a pump.

In some embodiments of the methods of the present disclosure, the in situ generation of nitrogen gas results in a foamed resin composition. In some embodiments, the use of the foamable resins of the present disclosure decreases the amount of loss circulation material required to plug vugular zones as compared to traditional loss circulation materials that are not able to expand and adapt in volume. Thus, in some embodiments of the provided methods, the foamed resin compositions of the present disclosure cure the losses in vugular zones while using less material than traditional LCMs.

EXAMPLES

Example 1

Two resin-based compositions were prepared and volume increase after curing was compared. Sample 1 (control) was prepared by mixing in a sample tube 15 g of an epoxy resin containing poly(bisphenol A-co-epichlorohydrin) (84-86%; CAS-No. 25068-38-6) and oxirane, mono[($C_{12-14}$ alkyloxy) methyl] derivatives (14-18%; CAS-No. 68609-97-2) (sold as Razeen® 2254 by Jubail Chemical Industries Co. (JANA), Saudi Arabia) with 2.25 g of a diethylene triamine curing agent (sold as Razeencure 931 by JANA). The mixture was mixed for 2 minutes, then kept in a water bath at 150° F. (65.5° C.) for 30 minutes. There was no visible increase in the volume of the resin plus curing agent (total volume=15.5 mL) after curing.

Sample 2 was prepared by mixing in a sample tube 15 g of an epoxy resin containing bisphenol-A-(epichlorohydrin) epoxy resin (84-86%; CAS-No. 25068-38-6) and oxirane, mono[(C12-14 alkyloxy)methyl] derivatives (14-18%; CAS-No. 68609-97-2) (sold as Razeen 2254 by JANA) with 0.5 g of a surfactant that was an aqueous solution of cocamidopropyl hydroxysultaine (sold as PETROSTEP® SB by Stepan, Northfield, Ill., USA) and 1.5 g of azodicarbonamide. The mixture was mixed well for 2 minutes using a glass rod, then 2.25 g of a diethylene triamine curing agent (sold as Razeencure 931 by JANA) was added and the mixture was mixed for an additional 2 minutes. The mixture was kept in a water bath at 150° F. (65.5° C.) for 30 minutes. The volume of the resin in Example 2 increased from 17.5 mL to above 50 mL.

As shown in FIG. 1, after 30 minutes in the 150° F. (65.5° C.) water bath, the control (Sample 1) did not exhibit an increase in volume of the cured (hardened) resin. FIGS. 2A and 2B show the sample 2 resin containing the surfactant and azodicarbonamide just after mixing (FIG. 2A) and after 30 minutes in the 150° F. (65.5° C.) water bath (FIG. 2B). The resin has significantly expanded and the volume increased from 17.5 mL to above 50 mL after 30 minutes as compared to the control sample after 30 minutes in the same conditions.

Example 2

A resin-based composition was prepared containing an epoxy resin, a surfactant, a nitrogen gas-generating compound, and a curing agent. The composition was prepared by mixing in a sample tube 15 g of an epoxy resin containing 2,2'-[(1-methylethylidene)bis(4,1-phenyleneoxymethylene)]bisoxirane (60-100%; CAS-No. 1675-54-3) and 1,6-hexanediol diglycidyl ether (10-30%; CAS-No. 933999-84-9) (sold as Razeen 2253 by JANA) with 0.5 g of a surfactant that was an aqueous solution of cocamidopropyl hydroxysultaine (sold as PETROSTEP® SB by Stepan) and 1.5 g of azodicarbonamide. The mixture was mixed well for 2 minutes using a glass rod, then 2.25 g of a diethylene triamine curing agent (sold as Razeencure 931 by JANA) was added and the mixture was mixed for an additional 2 minutes. The mixture was kept in a water bath at 95° F. (35° C.) for 30 minutes.

Figure 3B:
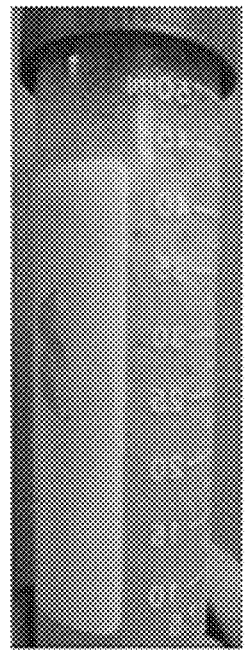

FIGS. 3A and 3B show the resin just after mixing (FIG. 3A) and after 30 minutes in the 95° F. (35° C.) water bath (FIG. 3B). The resin has significantly expanded and the volume increased after 30 minutes in the water bath.

Other Embodiments

It is to be understood that while the invention has been described in conjunction with the detailed description thereof, the foregoing description is intended to illustrate and not limit the scope of the invention, which is defined by the scope of the appended claims. Other aspects, advantages, and modifications are within the scope of the following claims.

What is claimed is:
1. A method of treating a loss circulation zone in a subterranean formation, the method comprising:
introducing a foamable resin composition into the loss circulation zone, the foamable resin composition comprising:

an epoxy resin selected from a bisphenol-A-(epichlorohydrin) epoxy resin with oxirane mono [($C_{12}$-$C_{14}$ alkyloxy)methyl] derivatives and a bisphenol-A-(epichlorohydrin) epoxy resin with 1,6-hexanediol diglycidyl ether in an amount of about 75% to about 85% by weight of the composition;

a nitrogen gas-generating compound in an amount of about 5% to about 15% by weight of the composition;

a hydroxysultaine surfactant in an amount of about 1% to about 5% by weight of the composition; and a curing agent in an amount of about 10% to about 13% by weight of the composition; and forming a foamed resin composition;

wherein the foamed resin composition seals the loss circulation zone.

2. The method of claim 1, wherein the foamed resin composition is formed under downhole conditions.

3. The method of claim 2, wherein the downhole conditions comprise temperatures between about 95° F and about 450° F.

4. The method of claim 1, wherein the epoxy resin is about 77% to about 78% by weight of the foamable resin composition.

5. The method of claim 1, wherein the nitrogen gas-generating compound is an azo compound.

6. The method of claim 5, wherein the azo compound is azodicarbonamide.

7. The method of claim 1, wherein the nitrogen gas-generating compound is about 7% to about 8% by weight of the foamable resin composition.

8. The method of claim 7, wherein the hydroxysultaine surfactant is cocamidopropyl hydroxysultaine.

9. The method of claim 1, wherein the hydroxysultaine surfactant is about 2% to about 3% by weight of the foamable resin composition.

10. The method of claim 1, wherein the curing agent is diethylenetriamine (DETA).

11. The method of claim 1, wherein the curing agent is about 11% to about 12% by weight of the foamable resin composition.

12. The method of claim 1, wherein the weight ratio of the nitrogen gas-generating compound to the surfactant is about 3:1.

13. The method of claim 1, wherein the curing agent is a linear ethylene amine containing two primary nitrogens and one secondary nitrogen.

* * * * *

UNITED STATES PATENT AND TRADEMARK OFFICE
CERTIFICATE OF CORRECTION

PATENT NO. : 12,049,549 B2  
APPLICATION NO. : 18/138830  
DATED : July 30, 2024  
INVENTOR(S) : Vikrant Bhavanishankar Wagle et al.

Page 1 of 1

It is certified that error appears in the above-identified patent and that said Letters Patent is hereby corrected as shown below:

In the Claims

Column 20, Line 8, Claim 8, delete "claim 7" insert -- claim 1 --.

Signed and Sealed this  
Third Day of December, 2024

Katherine Kelly Vidal  
*Director of the United States Patent and Trademark Office*